United States Patent
Dabral

(10) Patent No.: US 7,210,050 B2
(45) Date of Patent: Apr. 24, 2007

(54) INCREASING ROBUSTNESS OF SOURCE SYNCHRONOUS LINKS BY AVOIDING WRITE POINTERS BASED ON STROBES

(75) Inventor: Sanjay Dabral, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 632 days.

(21) Appl. No.: 10/232,157

(22) Filed: Aug. 30, 2002

(65) Prior Publication Data
US 2004/0044919 A1   Mar. 4, 2004

(51) Int. Cl.
G06F 1/12      (2006.01)
G06F 13/42     (2006.01)
G06F 1/04      (2006.01)
H04L 7/00      (2006.01)

(52) U.S. Cl. .................. 713/400; 713/500; 713/502; 713/503; 713/600

(58) Field of Classification Search ................ 713/400, 713/500, 502–503, 600
See application file for complete search history.

(56) References Cited

U.S. PATENT DOCUMENTS

| | | | | |
|---|---|---|---|---|
| 5,724,615 A | * | 3/1998 | Ishii ........................ | 710/61 |
| 5,774,001 A | * | 6/1998 | Mozdzen et al. ........... | 327/141 |
| 6,247,073 B1 | * | 6/2001 | Takeda ........................ | 710/61 |
| 6,516,362 B1 | * | 2/2003 | Magro et al. ................ | 710/58 |
| 6,928,574 B1 | * | 8/2005 | Radjassamy ................ | 713/501 |
| 2002/0199128 A1 | * | 12/2002 | Takeda ........................ | 713/500 |

OTHER PUBLICATIONS

U.S. Patent Application entitled "Method and Apparatus for Detecting Strobe Errors", U.S. Appl. No. 09/748,233 filed Dec. 27, 2000.
Bakoglu, H.B., Circuits, Interconections, and Packaging for VLSI, pp. 356-358.
W. J Dally & J.W. Poulton, Digital Systems Engineering, pp. 476-482.

* cited by examiner

*Primary Examiner*—Thuan N. Du
*Assistant Examiner*—Michael J. Brown
(74) *Attorney, Agent, or Firm*—Blakely, Sokoloff, Taylor & Zafman LLP

(57) ABSTRACT

A source synchronous scheme in which data from one clock domain is synchronized to a clock of a second clock domain. Using a more reliable clock of the second domain to control and adjust the alignment after the data is latched in allows more robust performance to maintain correctly ordered data. In this manner, a write pointer based on strobe signal(s) from the first clock domain may be avoided.

25 Claims, 11 Drawing Sheets

INCREASING ROBUSTNESS OF SOURCE SYNCHRONOUS LINKS BY AVOIDING WRITE POINTERS BASED ON STROBES

FIELD OF THE INVENTION

The present invention relates to an apparatus and method to synchronize data capture without using write pointers that are based on strobes.

BACKGROUND OF THE RELATED ART

Data transfer between two devices or systems may experience data synchronization problems if the two devices (or systems) do not share a common clock. In order to transfer data between two different clock domains, a strobe may be generated by the sending unit to identify the occurrence (timing) of the data being sent. For example, in source synchronous input/output (I/O) signaling, precisely known data and strobe timing relationship allows the capture of data at the receiver. In one commonly used source synchronous technique, data from the sending unit is coupled to a first-in first-out (FIFO) buffer and strobes from the sending unit trigger the entry points for the FIFO. In this technique, the strobes from the sending unit are coupled to a write state machine, which typically increments the pointer with the receipt of a data strobe. Accordingly, maintaining the integrity of the strobe and the write pointer is of great consequence. Glitches in the strobe, which may be duly recorded by the write pointer, may lead to error in subsequent transfers that may lead to system failure.

Recognizing that errors in data may occur, data may be protected using various known techniques. For example, a parity check procedure may be used to check parity of the received data. However, if the clocking strobes from the sending unit are not similarly protected as the data, then the strobes may compromise the link reliability between the two clock domains. When pointers are used in a write state machine to point to the FIFO entry location for the storage of the incoming data, maintaining the integrity of a strobe and the corresponding write pointer is of significant consequence. As noted above, any glitches in the strobe, absence of a strobe, or other undesirable strobe condition may cause the receiving unit to duly record an unwanted strobe entry or miss a strobe that should have been entered. This improper strobe indication by the write pointer may lead to errors in subsequent data transfers to proper locations in the FIFO unit and may cause severe errors in the core logic.

In order to ensure proper alignment of the FIFO to the incoming data, various strobe protection mechanisms have been devised. For example, in one technique strobe glitch protection and detection circuits are utilized to ensure the proper alignment of the pointer to the incoming data. In one such technique, a counter is used to count the strobe in the core clock domain and this count is checked by insuring that the current count and the previous count is one. In these schemes, an error is flagged and a machine check taken to correct the problem. Other schemes have used a phase lock loop to filter the strobes. However, these various techniques attempt to correct the synchronization timing problem of the pointer by making the adjustment or the correction in the sending clock domain.

DETAILED DESCRIPTION OF THE INVENTION

Figure 1:
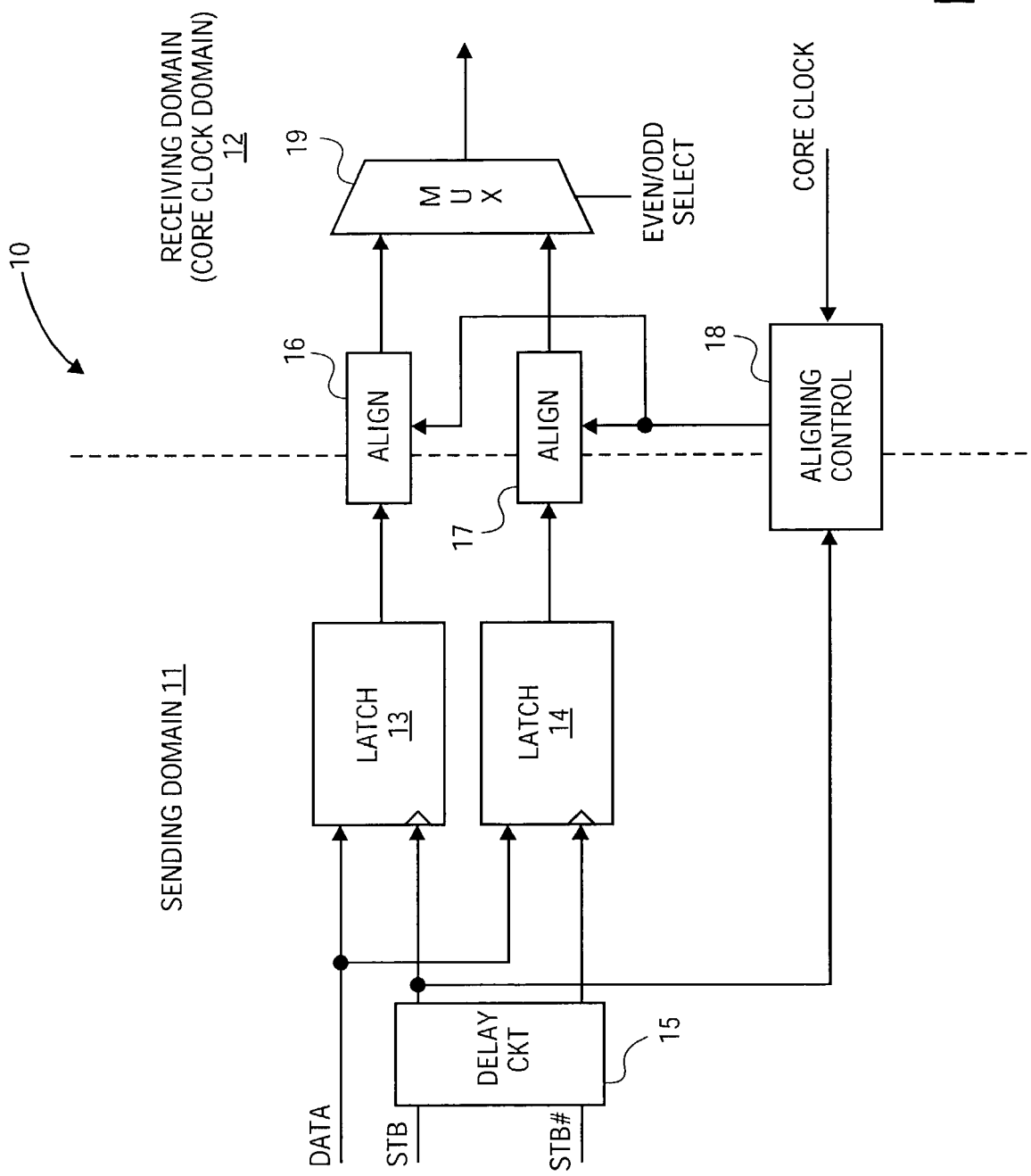
FIG. 1 is a block schematic diagram showing one embodiment of the invention in which data from one clock domain may have its timing synchronized to be received by a second domain operating under a different clock.

FIG. 1 illustrates an embodiment of the invention in which circuit 10 generally provides data transfer between two domains. The example embodiment shown in FIG. 1 illustrates data transfer from a sending (or transmitting) domain 11 to a receiving domain 12. In the example embodiment, the sending domain operates within one clock domain, while the receiving domain 12 operates under a separate clock domain, but same frequency. In the particular example, the receiving domain 12 is shown as a clock domain comprised of a clock that provides clock timing to a core of a processor. The example in FIG. 1 labels this clock as a core clock, so that the receiving domain 12 may operate as a core domain of a processor. It is to be noted that the sending domain 11, as well as the receiving domain 12, may comprise various components, devices and/or units not shown in FIG. 1. Functionally, the two domains 11, 12 operate as separate clock domains and in the particular example embodiment of FIG. 1, the sending domain 11 may be an input/output (I/O) clock domain while the receiving domain may operate as a core domain in which the clock timing is associated with the core clock of a processor.

The example circuit 10 is comprised of two latches 13, 14. The data being transmitted, such as from an I/O peripheral or memory unit, are coupled as inputs to latches 13, 14. Clocking signals of the sending domain may also be coupled to latches 13, 14. In the particular embodiment shown, strobe signals provide the clocking signal to clock the data into the latches 13, 14. In the particular example, a strobe signal STB is coupled to the latch 13 while it's complement STB# is coupled to the latch 14. The STB and STB# signals are collectively referred to as strobe signals in the description below. Thus, STB strobes the data into the latch 13, while STB# strobes the data into the latch 14. In some instances, a delay circuit 15 may be present. The strobe signals are coupled through the delay circuit 15 in order to delay the strobe signals to the latches 13, 14. The delay of the strobe timing to the latches 13, 14 ensures that the data is present at the input of the latches 13, 14 before the strobe signals trigger the data into latches 13,14.

In the embodiment shown as circuit 10, the delay circuit introduces an appropriate delay of the strobe signals being coupled to latches 13, 14 to ensure the presence of the data at the input of the latches 13, 14 before the strobes arrive. In one particular embodiment the STB and STB# signals may be delayed by about 90° by the use of the delay circuit 15. It is to be noted that the strobe timing to input the data into the latches 13, 14 occurs under the timing of the sending domain 11. That is, the clocking scheme of the sending domain 11 controls the generation of the two strobe signals STB and STB#.

As noted above, the sending domain 11 operates under the clocking scheme of the device sending the data to the latches 13 and 14. The STB and STB# signals operate under the clocking scheme of the sending domain 11. Thus, the data is latched into latches 13, 14 by the timing provided by the strobe signals STB and STB#. As was noted above, the strobe signals may be delayed, such as by the use of the delay circuit 15, to ensure that the data is present at the latches 13, 14 before the data is strobed into the latches 13, 14. As will be described below, latches 13 and 14 alternatively latch in the incoming data, so that odd numbered data may be latched into one latch 13 (or 14) and the even numbered data may then be latched into the other latch 14 (or 13). The latches perform the function of a data receiving unit to receive and latch in the data from another component, device or system. For example, the data may be sent from a memory component. Furthermore, other devices, other than latches, may be utilized as the data receiving unit.

The output of the latch 13 may be coupled through an aligning delay unit 16, while the output from the latch 14 may be coupled through an aligning delay unit 17. The aligning delay units 16, 17 align the corresponding data output from the latches 13, 14 to have proper timing alignment with the circuitry operating within the receiving domain 12. As noted in the embodiment of FIG. 1, the receiving domain 12 may operate as a core domain of a processor, in which a core clock controls the timing of the various devices within the receiving domain 12.

In the example circuit 10, the aligning delay units 16, 17 introduces corresponding aligning delay of the latch outputs to align the data timing from the latches 13, 14 to the timing of the components operating within receiving domain 12. In order to achieve the alignment, an aligning control unit 18 controls the amount of delay introduced by the aligning delay unit 16, 17. In order to achieve this alignment, the aligning control unit 18 receives the STB signal from the sending domain 11, along with the core clock from the receiving domain 12. The aligning control unit 18 compares the timing of the strobe signal to the core clock signal and then introduces the appropriate delay adjustment to the aligning delay unit 16, 17 to synchronize the data timing to the clock timing of the receiving domain 12. A variety of circuits, including a phase lock loop, may be implemented to provide this timing comparison. The aligning control unit 18 may use the STB# signal, instead of the STB signal, or use both STB and STB# signals. A multiplexer (mux) 19 selects the correct latch output (odd/even data) corresponding to the data synchronization.

Although a particular delay and control units are described above, the data aligning unit may be comprised of various other designs. The delay units 16, 17 and the control unit 18 are but one example. Furthermore, the data path is shown is into two separate data paths so that two data input entries may be latched in for each cycle of the strobe. One data entry may be latched in with the STB strobe edge transition, while a second data entry may be latched in with the STB# strobe edge transition. It is to be noted that the data receiving function may be done with a single path, two paths or more than two paths. Only the two path embodiment is shown and described in detail herein.

It is to be noted that the particular example embodiment shown in FIG. 1 controls the alignment of the data between the two different clock domains 11, 12 after the data is latched into the data latches 13, 14. Thus, a write state machine or some other device which would utilize a write pointer (or pointers) to control FIFO operation need not be present at the data latch interface of the two domains 11, 12. Instead the data is latched through the latches 13, 14 and the alignment may be achieved after the data is latched. This alignment actually occurs at the aligning delay unit 16, 17, after the data is latched in from the sending domain 11. Thus, the alignment may be effected under control of the more reliable core clock, instead of the more error prone strobe signal of the sending domain 11. It is to be noted that this transition from one clock domain to the second clock domain for the data, occurs beyond the latches 13,14 and not at the input of these data capture latches. In the particular embodiment the timing synchronization occurs with the aligning delay units 16, 17.

Figure 2:
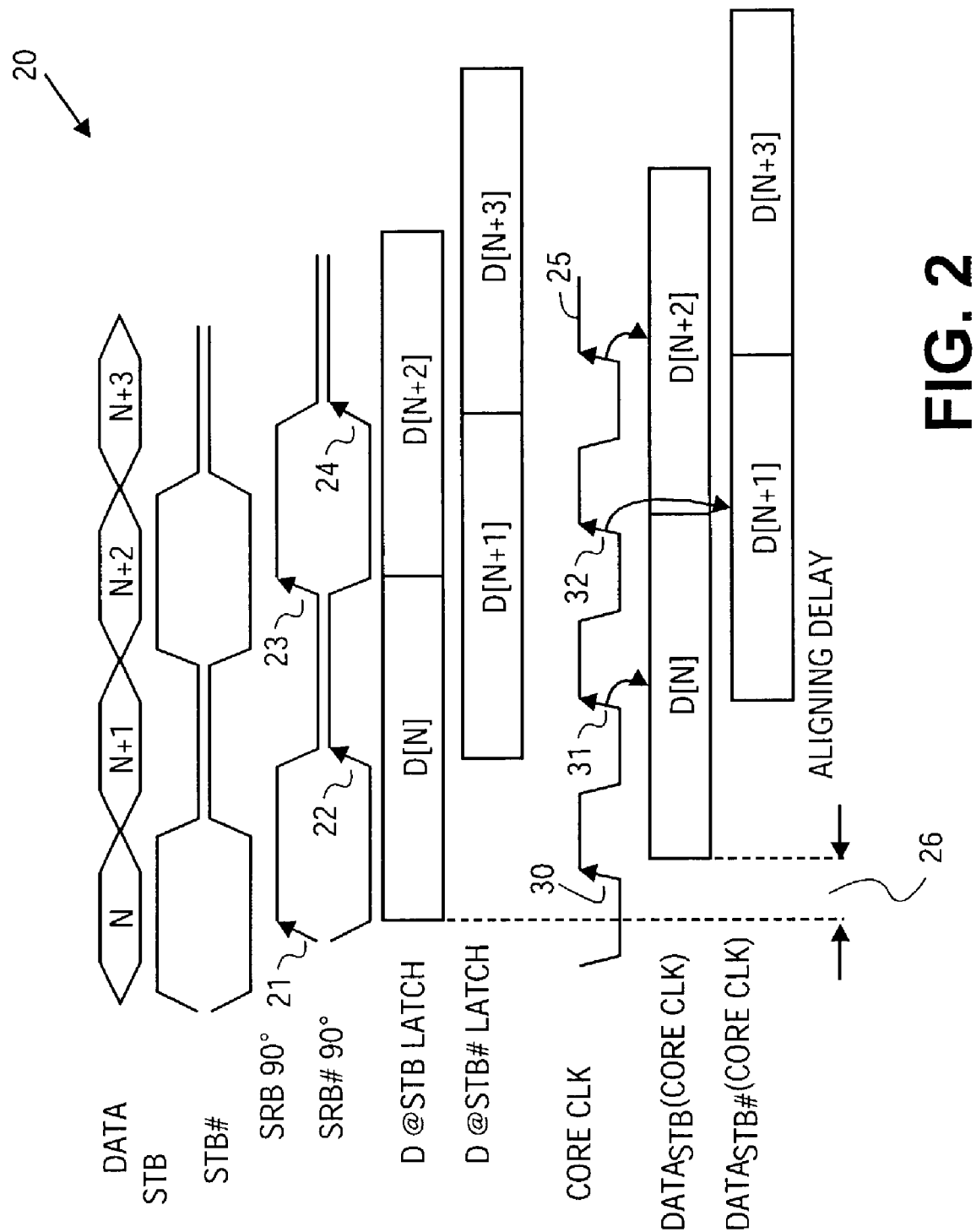
FIG. 2 is a waveform diagram showing a timing relationship of the data as the data progresses through the circuit shown in FIG. 1.

Also referring to FIG. 2, an example timing diagram 20 of the various signals applicable to the circuit 10 of FIG. 1 is illustrated. The example timing diagram 20 of FIG. 2 shows the presence of data D at times N, N+1, N+2, and N+3. The strobe signals STB and STB# are shown synchronized to the data in the diagram 20. As noted, the STB and STB# strobe signals are generally controlled by the clock timing of the sending domain 11 and, in some applications, some amount of delay may be advantageous. In the embodiment described, delay may be utilized to ensure that the edge triggering of the strobe signal occurs at a point where data is certain to be valid at the input of the latches 13, 14.

In the example circuit 10, the delay circuit 15 introduces appropriate delay to delay the triggering of the latches 13,14 to latch in the data. A sequence of data input is shown as D[N], D[N+1], D[N+2], and D[N+3] in FIG. 2. FIG. 2 shows an example embodiment in which the strobe signals are delayed by a phase of 90° to ensure that data is present at the input of the latches 13,14 before the strobe signals latch the data into the latches 13,14.

The source synchronous scheme of FIG. 2 latches in data alternatingly to latches 13, 14. In the particular example of the diagram 20, the delayed strobe signals STB90° and its complement STB#90° latch data into one or the other of the latches 13, 14, when these latches are edge triggered by the delayed strobe signals. In the example embodiment described, two data entries may be latched in for every cycle of the strobe signal. Thus, edge 21 of the STB90° signal latches in data D[N]. In the particular example, the rising edge of the strobe signal STB90° latches the data D[N] through the latch 13.

Subsequently, when data D[N+1] is present at the input of the latches 13, 14 the rising edge 22 of the STB#90° signal causes data D[N+1] to be latched into latch 14. Likewise during the next rising edge transition 23 of the STB90° signal data D[N+2] is latched in through the latch 13 and during period N+3 the rising edge 24 of the STB#90° signal causes data D[N+3] to be latched into the latch 14. Accordingly with the occurrence of the strobe signal edges, the latches 13, 14 alternatingly latch in the data.

Since the source synchronous scheme is to align the timing of the data in the sending domain 11 (which is the I/O domain in the example) to the timing of the receiving domain 12 (which is the processor core domain in the example), a core clock signal 25 is shown in the diagram 20. It is to be noted that the core clock 25 in the example has a higher frequency than the strobe signals STB and STB#.

However, it is to be noted that the actual frequency difference between the two domains 11, 12 may vary from system to system, depending on the system as well as the number of latches present. Since the synchronization of the core clock 25 may vary considerably in relation to the presence of the data, an aligning delay period 26 may be introduced to ensure synchronization between the latched in data and the occurrence of the edge trigger point of the core clock 25.

In the example diagram 20, the delay period 26 introduces a delay of the data between the output of the latches 13,14 and the mux 19. This aligning delay 26 ensures that the data synchronizes with the core clock of the receiving domain 12. In reference to the circuit 10 of FIG. 1, the aligning delay period 26 may be introduced by the aligning delay units 16, 17 to synchronize the data from the output of the latches 13, 14 to synchronize with the core clock 25.

As shown in diagram 20 of FIG. 2, the alignment of the data occurs with the next rising edge 30 of the core clock 25 so that the subsequent rising edge 31 clocks the data D[N]. The next clock edge 32 of the core clock 25 clocks the data D[N+1]. Subsequent data may then be clocked in with subsequent rising edges of the core clock 25. The aligning delay 26 ensure that proper synchronization may be achieved between the data at the output of the latches 13,14 and the timing of the clock signal 25 in the receiving domain 12. The determination as to how much of an aligning delay 26 needs to be present to ensure proper synchronization is the function of the aligning control circuit 18 for the embodiment circuit 10 of FIG. 1.

The example embodiment of the invention shown in FIG. 1 and the accompanying example diagram 20 of FIG. 2 illustrate an advantage of the described example embodiment in which an aligning delay allows the data from source synchronous clock domain to be transferred to the receiving clock domain. It is generally known that strobe signals may be prone to glitches and or to missed strobes and where such glitchy strobes may have adverse impact on timing of the data input to synchronous timing circuits. Furthermore, since a write state machine need not be utilized at the input of the latches, strobe glitches or misses would not disrupt the synchronization of the write state machine. In other words, the lack of a write state machine, which would implement a pointer based on strobe inputs to point to locations of a FIFO, need not be present with the embodiment shown in FIG. 1. Accordingly, strobe glitches or misses which would disrupt the FIFO pointer may not be disruptive with the practice of the embodiment described above.

Figure 3:
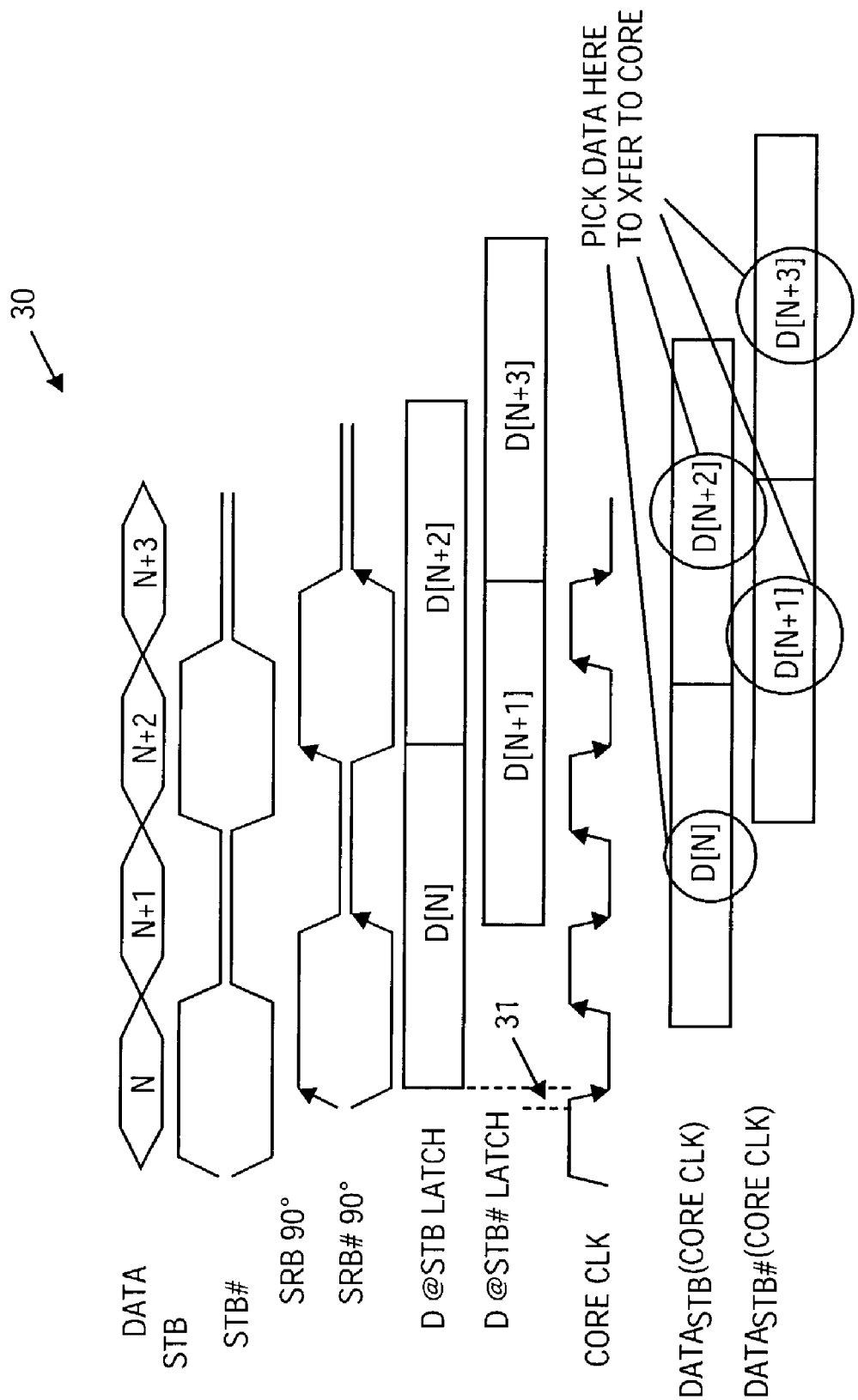
FIG. 3 is a waveform diagram showing a timing differential between the two domains of FIG. 1.
Figure 4:
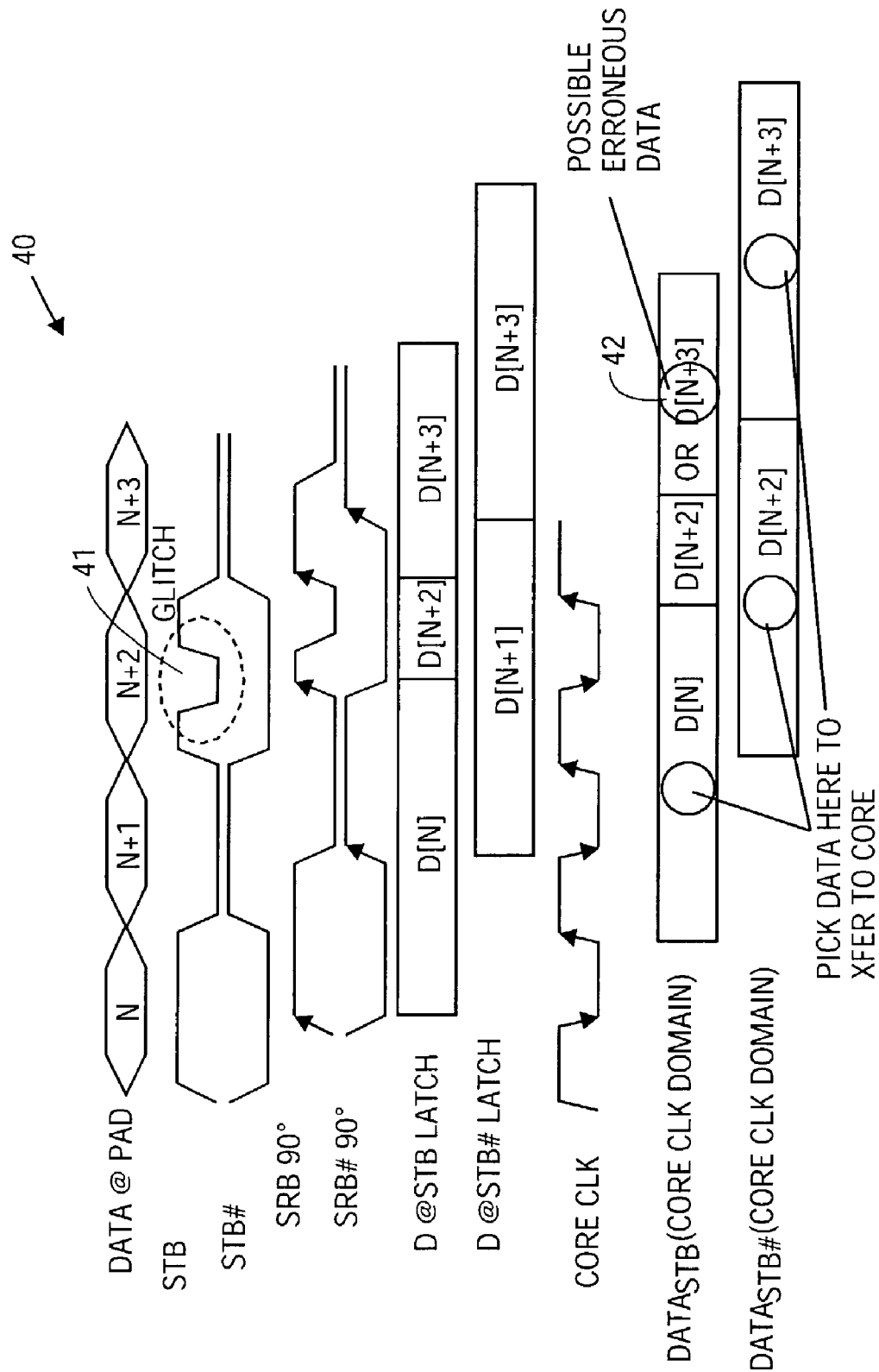
FIG. 4 is a waveform diagram showing an example of a situation when a glitch is present in a strobe in the diagram shown in FIG. 3.
Figure 5:
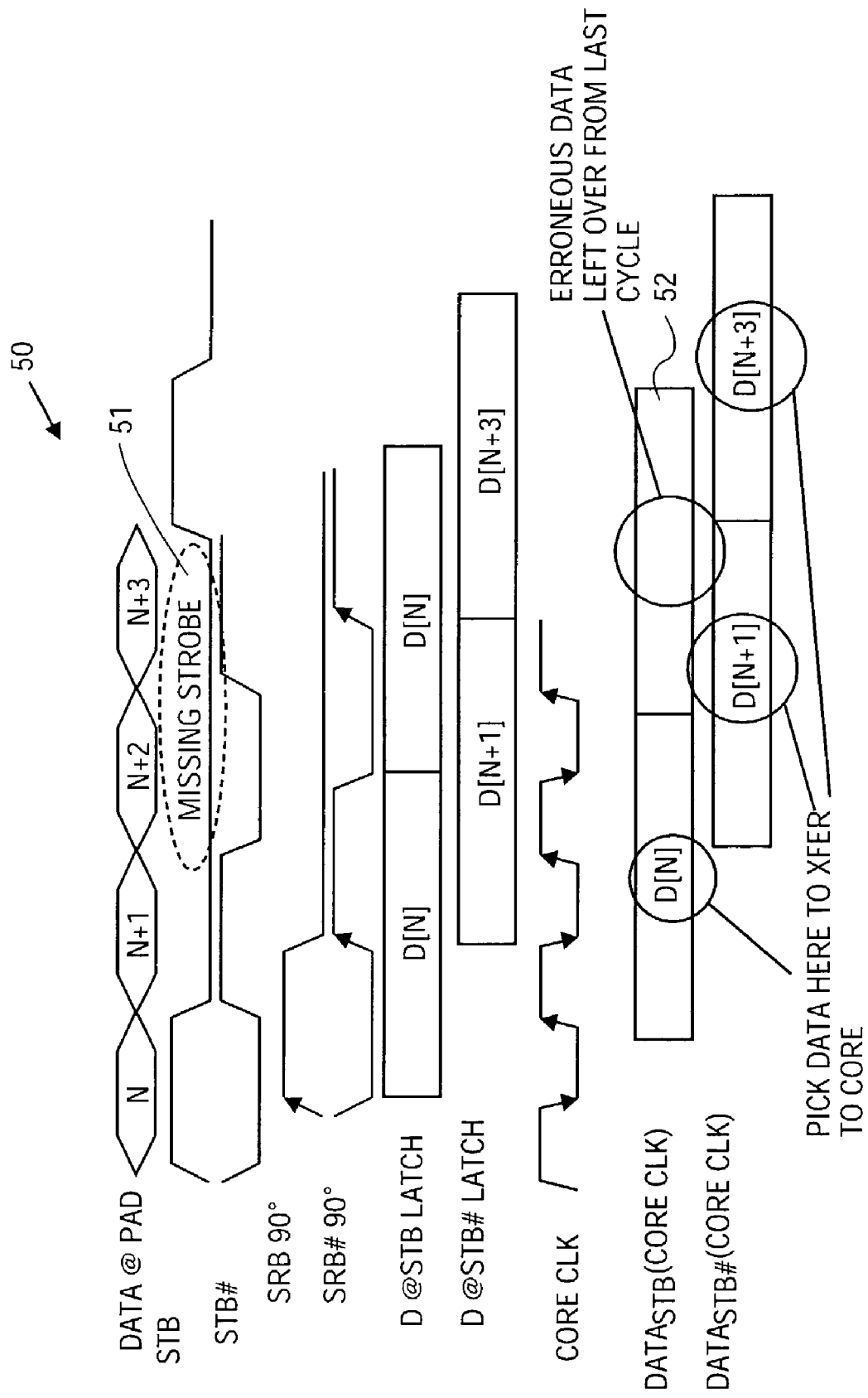
FIG. 5 is a waveform diagram showing an example of a situation when a strobe is missing in the diagram shown in FIG. 3.

FIGS. 3–5 show several implementation scenarios that may occur during data synchronization. FIG. 3 shows an example waveform diagram 30, equivalent to that of diagram 20, in which the core clock of the receiving domain just misses the data at the strobe latch (as shown by the missed period 31). However, the data may be accurately captured on the next positive edge of the core clock cycle so that data D[N]–D[N+3] may still be captured by the subsequent sequence of rising clock edges of the core clock cycle.

FIG. 4 illustrates a situation in which one of the strobes, STB, has a noticeable glitch 41. The presence of the glitch 41 in the waveform diagram 40 may cause an erroneous data to be picked up by one of the latches, since the glitch 41 may trigger a false data latch. This is shown by the erroneous data pickup 42. The actual data should be D[N+2]. The presence of the glitch 41 may cause the latch to latch in the erroneous data 42, which may be latched out as the output. However the transfer of the next data D[N+3], as well as subsequent data, are not affected by the pickup of the erroneous data 42. If a FIFO pointer or counter had been used with a write state machine, the data glitch may have incremented the count and loaded the data into a different FIFO location erroneously. All subsequent data would then have been misaligned.

FIG. 5 illustrates a situation when a strobe is missing. In diagram 50 a missing strobe 51 fails to latch in the data D[N+2] so that the latched data to the core domain may contain erroneous data. This data may have been left over from the last cycle. Again the data entry for data D[N+2] may be erroneous. However, the next data D[N+3], as well as subsequent data, still maintains the correctly ordered data into the correct entry. Only the data attributed to the erroneous data 52 would be impacted. Although the true D[N+2] data may be missing, most likely the remaining data capture will have occurred at the proper entry positions. A verification procedure, such as parity checking, allows for the device in the receiving domain to detect that this data 52 is invalid and institute some action to retrieve the correct data.

It is to be noted that with the above examples, a data glitch or a missing strobe may cause a corresponding data to be incorrectly read into the core domain. However, the timing sequence for the data may not disrupted, so that the following data when received may be transferred into the core domain in proper timing sequence. With systems employing state machines and/or pointers responsive to the input data strobes, the missed or additional strobe may disrupt the corresponding entry as well as subsequent entries in the sequence. With the embodiments of the invention described, erroneous data coupled into the core domain may be handled by various procedures available to the component or devices in the core domain. For example, if a processor is present in the receiving domain, then various data checking procedures normally implemented with data handling may be utilized to retrieve the correct data.

In the embodiment earlier described, the aligning delays provided by the aligning units 16 and 17 ensure that proper timing match occurs between the timing signals of the sending domain 11 and the receiving domain 12. Since the edge timing of the strobe signals and the core clock signal may vary significantly, the aligning control unit 18 controls the amount of the delay needed to ensure proper synchronization of the data into the receiving domain 12. It is to be noted again that a variety of circuitry may be implemented to achieve the aligning delay introduced by aligning unit 16, 17. Similarly various circuitry may be implemented for the aligning control unit 18 as well.

Figure 6:
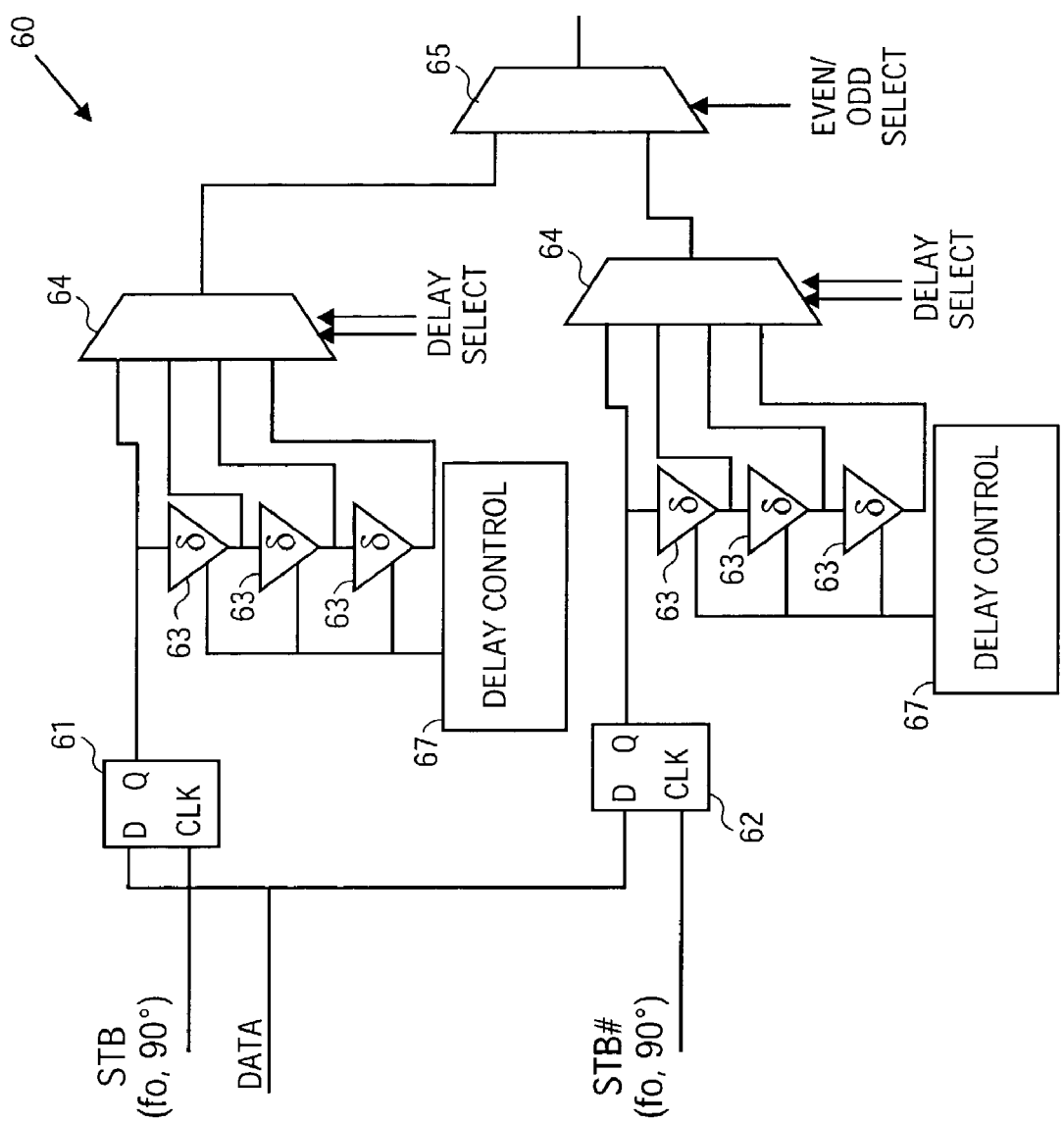
FIG. 6 shows one embodiment of a delay circuit in which analog delay is used to delay the data to synchronize data timing.

FIG. 6 shows one embodiment of a circuit 60 to generate the delay for the aligning delay unit. Latches 61, 62 of circuit 60 correspond to the latches 13, 14 of the circuit 10 of FIG. 1. Frequency fo corresponds to the strobe frequency. The output from the latches 61, 62 are shown coupled to serially arranged delay elements 63 in which the delay elements 63 introduce a certain amount of delay serially in transferring the signal. In the particular example, the delay elements 63 are comprised of amplifiers which introduce delay. It is to be noted that a variety of delay introducing devices may be used for the delay elements 63. The outputs from the delay elements 63, along with the output from the respective latches 61, 62 are coupled through a corresponding set of muxes 64 and to an even/odd select mux 65. The introduced delay in the delay elements 63 may be set as the inherent delay of the amplifier or a separate delay control circuit 67 may be utilized to control the amount of the delay through a given delay stage 63. A set of such delay elements 63 may be utilized with the latches to introduce delay for the different data paths.

A variety of circuits may be utilized to select the proper data delay to synchronize the data output to the clock timing of the receiving domain, such as the processor core domain as earlier described. The data with the proper delay may be selected by muxes 64 and mux 65 selects from the even/odd data pairs. A variety of circuits may be implemented to control the delay select for muxes 64. One such example circuit is shown in FIG. 7.

Figure 7:
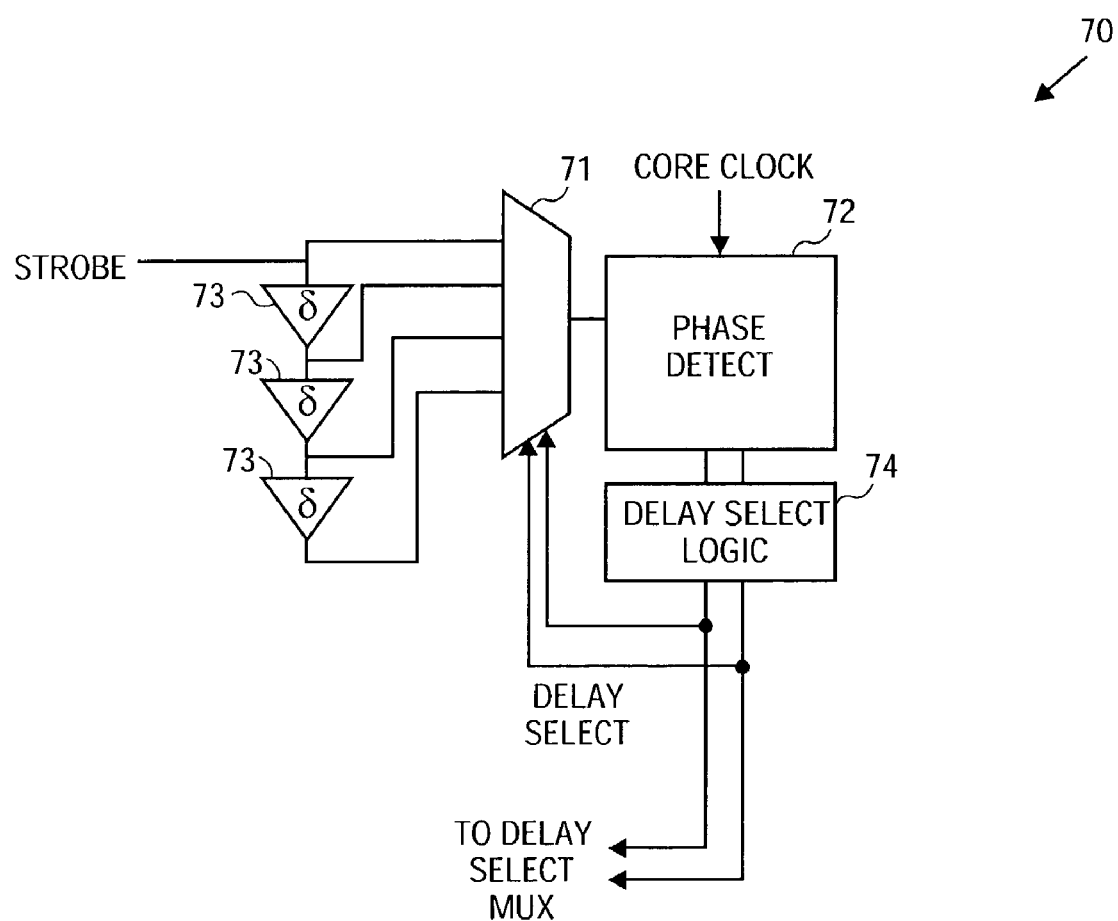
FIG. 7 shows one embodiment of an analog delay select circuit to select appropriate control signals to determine the delay for the circuit shown in FIG. 6.

FIG. 7 shows an example circuit 70 to generate the delay select signal for the delay select multiplexers 64 of FIG. 6. The strobe signal is input to a mux 71 and to a series of delay element 73 stages. The delay elements 73 (again, shown as delay introducing amplifiers) function equivalently to delay elements 63 to generate various timed delays of the strobe signal that are also input to the mux 71. The mux 71 output may then be coupled to a phase detect unit 72. The phase detect unit 72 also receives the core clock signal and compares the output of the mux 71 to the phase of the core clock for proper synchronization of the strobe to the core clock. The phase detect unit 72 is coupled to a delay select logic 74 which generates the delay select signal for the mux 71 to select the proper strobe delay for alignment of the strobe to the core clock. Again, a phase lock loop may be employed to determine the amount of the timing difference between the two timing signals. The delay select signal is also coupled to the muxes 64 of the circuit 60 of FIG. 6. It is to be noted that FIG. 7 is but one example embodiment of a delay loop to select the proper delay timing.

In reference to the circuit 10 of FIG. 1, the aligning control unit 18 may comprise the circuit 70 to control the synchronization between the two domains 11, 12. In that instance, aligning delay units 16, 17 of circuit 10 may comprise amplifiers 63, muxes 64 and control circuit 67 (if used) to provide the appropriate delay for the data path.

Figure 8:
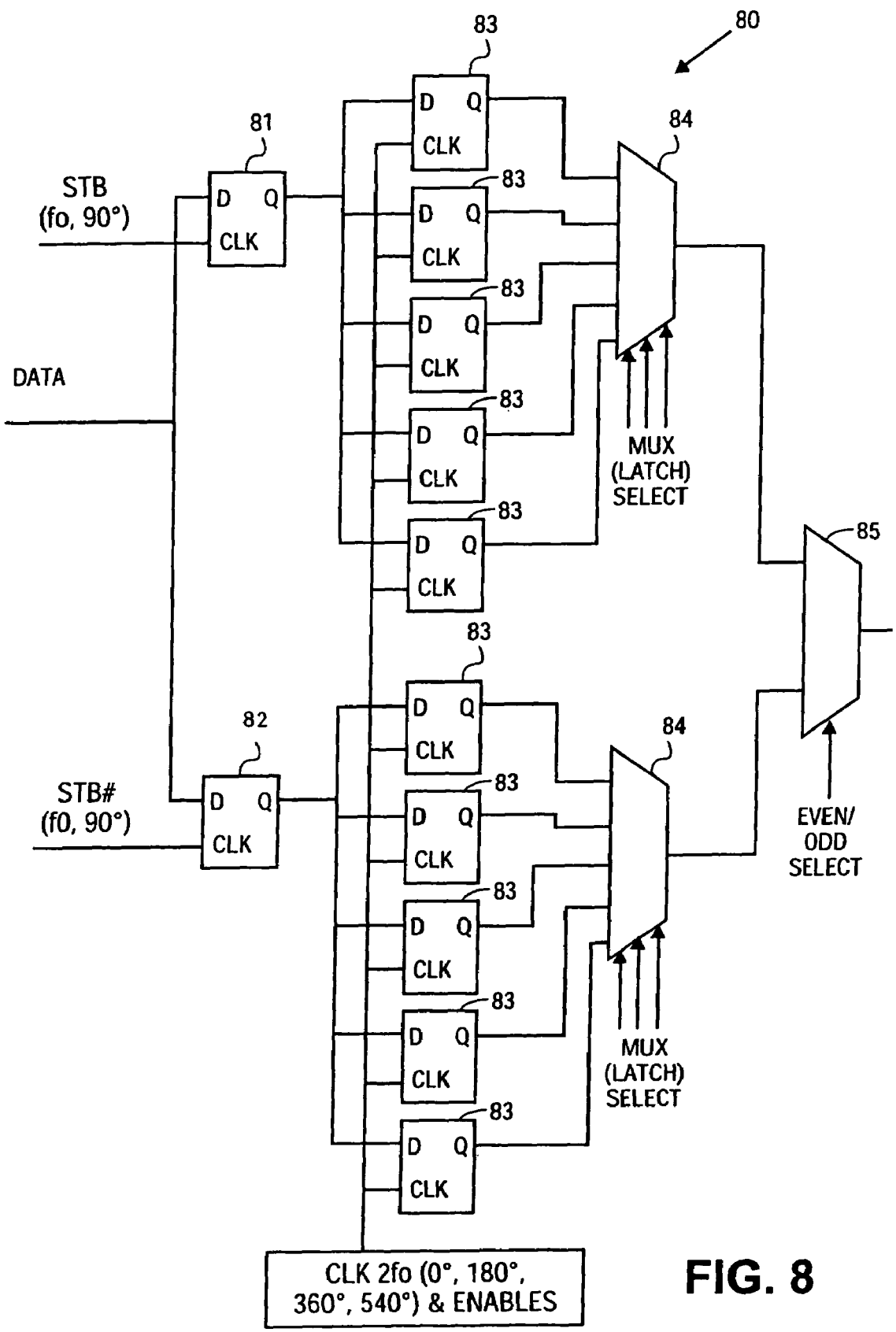
FIG. 8 shows one embodiment of a delay circuit in which digital delay is used to delay the data to synchronize data timing.

The aligning delay as well as the aligning control may be implemented using digital techniques. Thus, in FIG. 8 a digital aligning delay circuit 80 is shown as one embodiment of this digital technique. Again, latches 81, 82 correspond equivalently to the latches 13, 14 in FIG. 1. The delay circuit 80 uses five separate latches 83 to establish five different delays for the even or odd data paths. In this particular embodiment, the core clock may be set to operate at twice the frequency (2 fo) the input strobe signal frequency (fo). For example, in one embodiment fo may be set at 400 MHz and 2 fo may be set at 800 MHz The digital delay may be introduced by phase shifting the clock signal to the delay latches 83, so that the data coupled as an output of the delay latches 83 has a predetermined phase difference and hence the incremental delay. In one example the phase difference between the latches 83 may be set at 180°. Similar to the analog delay arrangement, the various delayed outputs from the delay latches 83 may be coupled to respective muxes 84 and then to the even/odd data mux 85.

Again, similar to the circuit used to provide the aligning control unit 18, an equivalent digital arrangement may be implemented. Thus in FIG. 9, a digital circuit 90 implements five latches to phase shift the input strobe signal STB to have various delays. The circuit may be readily designed to implement the use of the STB# signal instead.

In this particular scheme, the mux select logic may be determined by the logic noted in the table 93. The input entries A, B, C, D and E pertain to the output of the delay latches 91 and the entries in the columns in the table 93 denote the various states of the outputs (A–E) from the latches 91 which are inputs to the table 93. Entry F is shown, but may be discounted in the example. That is, the pattern ("0" and "1") shown in the table 93 correspond to the outputs (A–E) from the delay latches 91. A letter designation A–E specify the correct output selection for a given input. For example, if A–E happen to be all "O's", then the max select signal output selects mux C. An example waveform diagram corresponding to the signal states for the circuit 90 is illustrated in FIG. 10.

Figure 9:
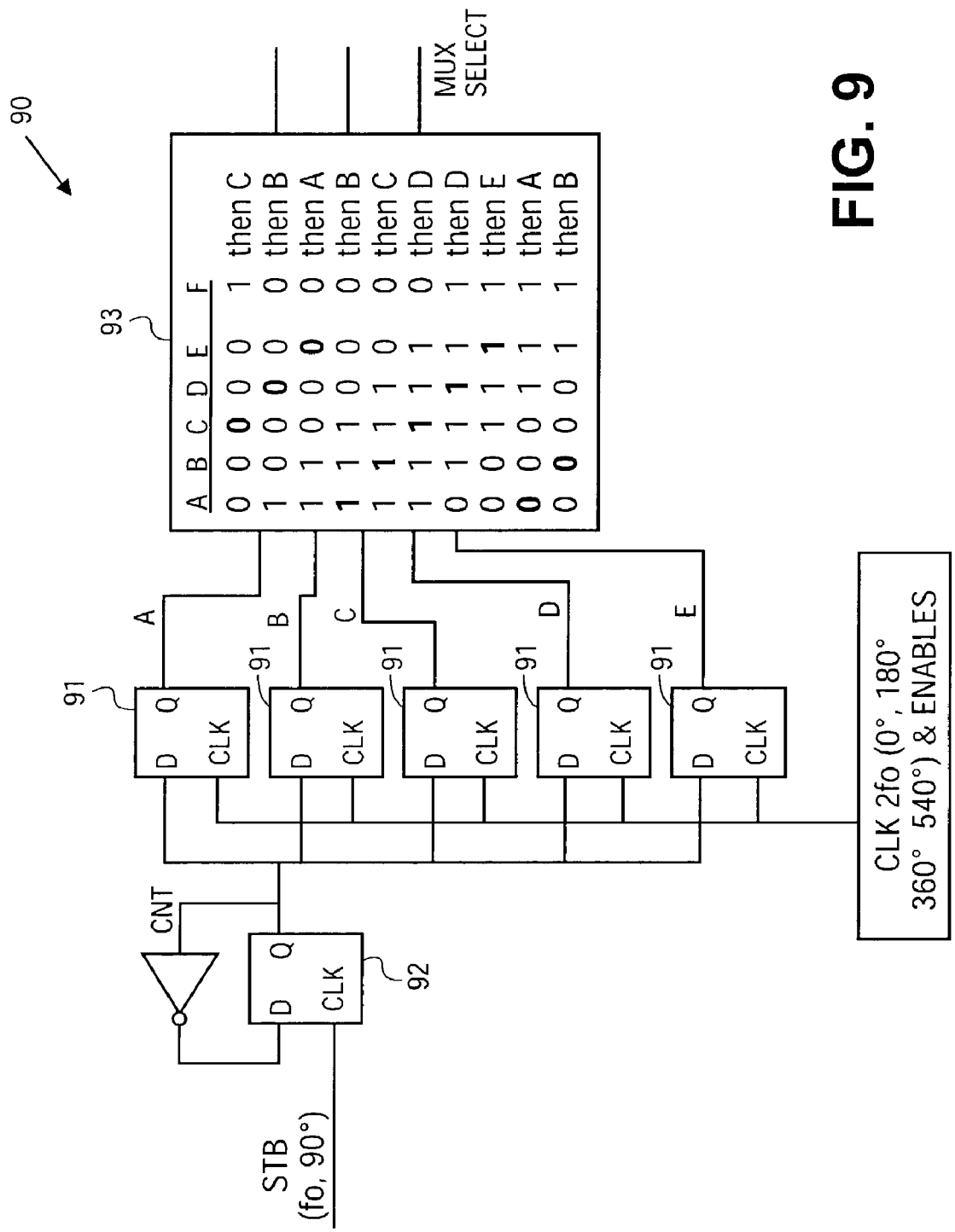
FIG. 9 shows one embodiment of a digital delay select circuit to select appropriate control signals to determine the delay for the circuit shown in FIG. 8.
Figure 10:
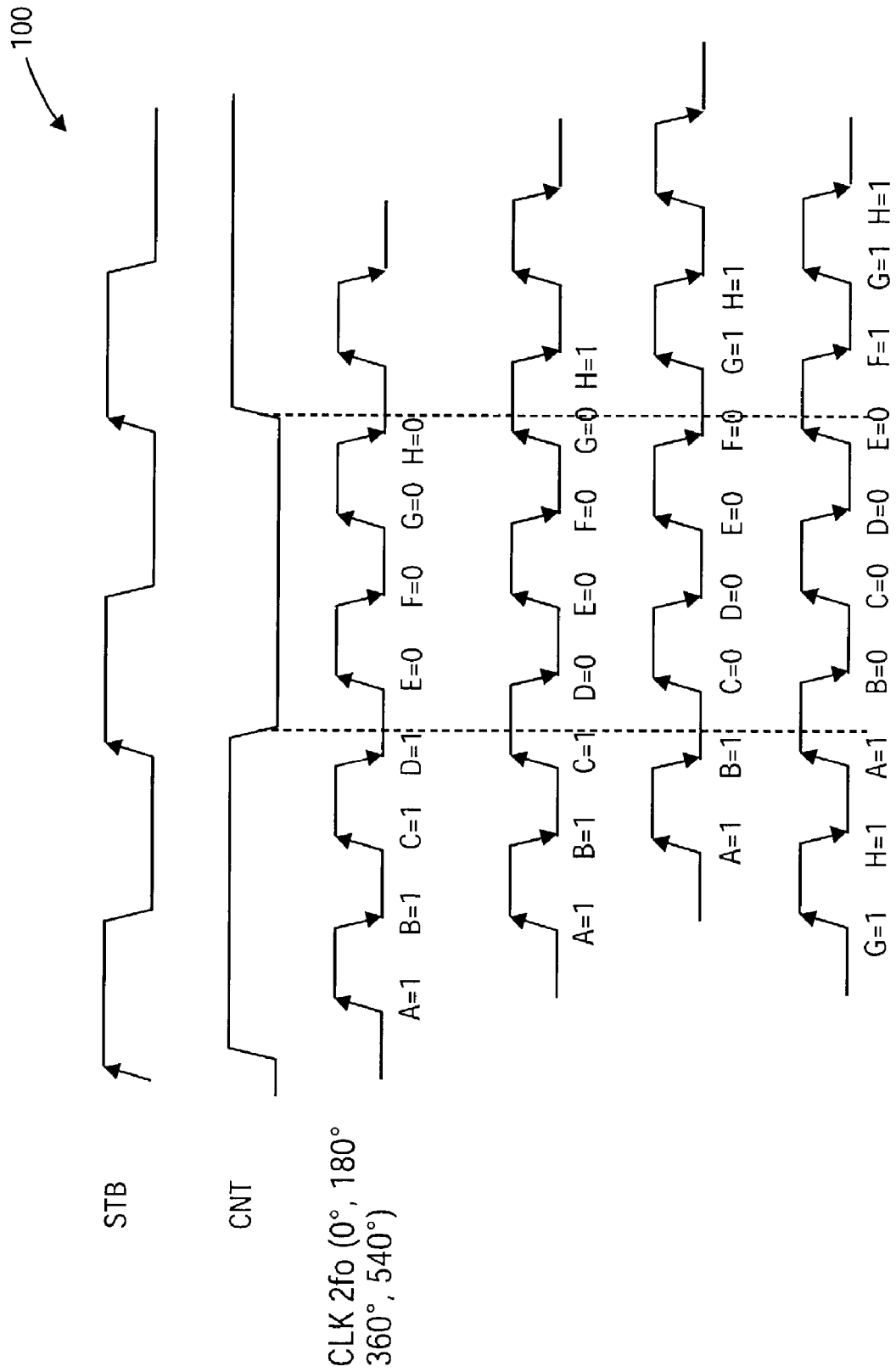
FIG. 10 shows a waveform diagram to select the proper delay for the table shown in FIG. 9 with different core clock to strobe relationship.

Referring to FIGS. 9 and 10, the strobe signal STB and the latch 92 feedback signal CNT are shown, in which the CNT signal is half the frequency of the STB signal. A clocking diagram 100 of FIG. 10 shows the occurrence of two cycles of the latch 91 clocking signal for a cycle of the STB signal. This is due to the core domain having twice the clock frequency as the strobe signal in the shown example embodiment. Thus, for one cycle of the CNT signal, there are two cycles of STB and four cycles of the latch 91 clocking signal. Both the rising and falling edges of the latch clocking signals may be utilized in this example, so that there are eight edge transitions, rioted A–E for each cycle of the CNT signal. The values A–E in the table 93 correspond to the edges A–E of FIG. 10. Note that F–H edge transitions are present but not used in the example for the mux select determination.

As noted, the input latch 92 provides a toggle feedback so that the strobed data toggles at half the clock rate (noted by CNT) of the input strobe signal. Due to the phase shift occurring at every 180°, the pattern of 0's and 1's are distributed over eight edge transitions (A–H) in which five of the sequential signal values (A–E, or any other combination of 5) may be picked off for use within the table 93. Thus, ten entries are used in this embodiment to cover the sequence of signal changes from 00000 to 00001. At this point the sequence is repeated. The table 93 essentially shows the sequence of five 0's or five 1's moving across eight positions in which five of the positions A–E are picked off to select the proper synchronization point for generating the mux select signal to mux 84 of circuit 80.

The table 93 depicts which output A–E may be selected. For a given pattern of "1s" and "0s" noted at the output of the latches 91, the bold value in the row identifies the corresponding mux A, B, C, D or E that will be selected. This value is then used to generate the mux select (latch select) signal to the muxes 84, to select the corresponding output from the latches 83 as the output from the muxes 83. Accordingly digital delay circuit utilizing a predetermined phase shift to introduce delay may be implemented as one approach to providing a digital aligning delay, as well as digital delay control to select the proper delay for synchronizing the data from one domain to the other.

It is appreciated that the various schemes for introducing delay in the aligning delay units as well as the selection of the proper delay by the delay control unit may be implemented in analog or digital form, whether utilizing the example embodiments described above or other embodiments which may readily be adapted for use with in synchronizing the data clocking from one domain to the other.

Figure 11:
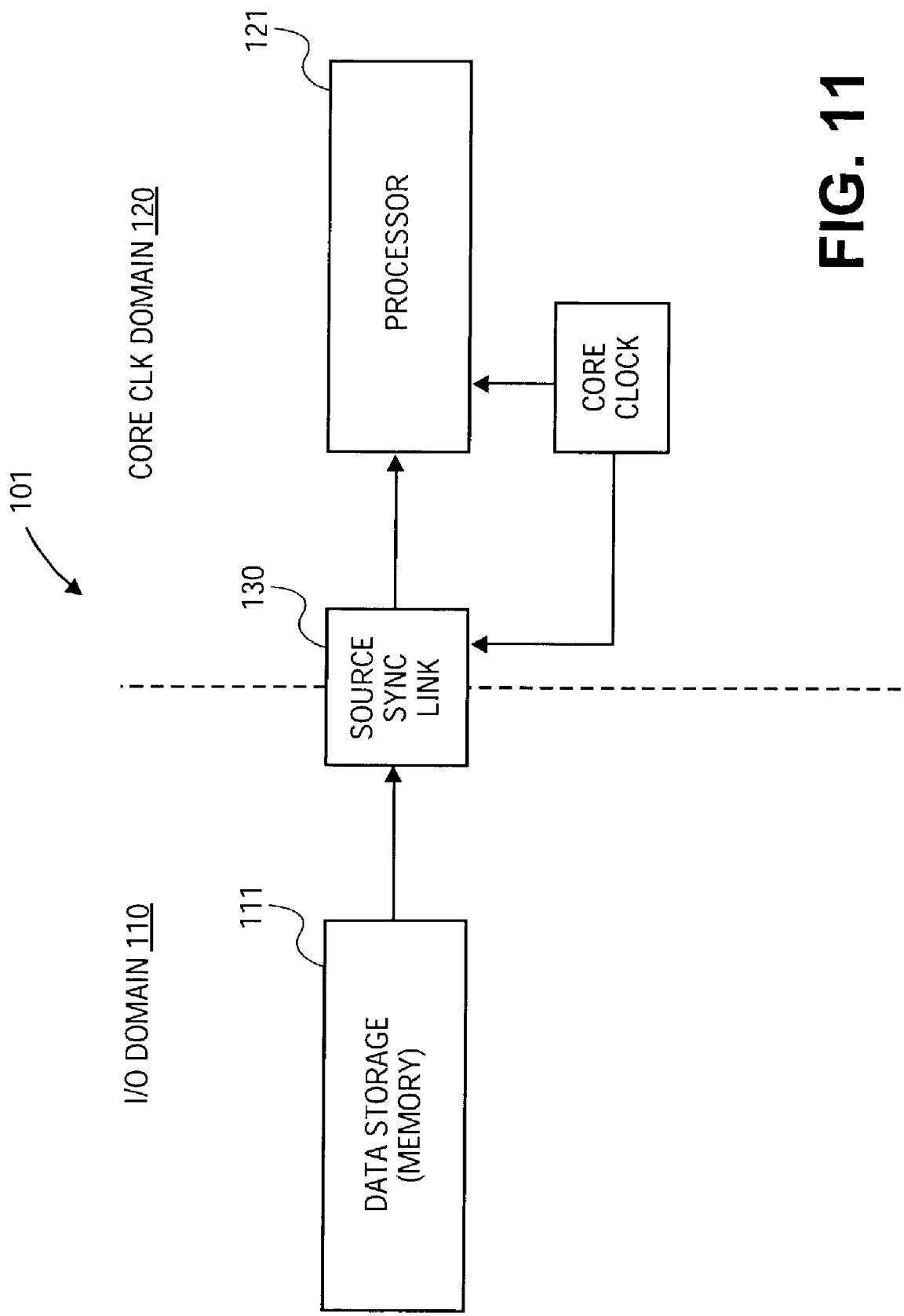
FIG. 11 is a block schematic diagram showing one embodiment of a computer system in which data from an I/O is synchronized by a core clock into a processor domain of the computer.

FIG. 11 illustrates one environment in which the above described embodiments of the invention may be implemented. In FIG. 11 a computer system 101 is shown, including an I/O domain 110 and a processor domain 120. The I/O domain 110 may include a variety of I/O components and in the example, a memory 111 is shown. The I/O domain 110 in this example corresponds to the sending domain 11 of FIG. 1.

The processor domain 120 includes a processor 121 to process the data from memory 111 and the domain 120 corresponds to the receiving domain 12 of FIG. 1. The I/O domain 110 may operate with a first clock and the processor domain may operate with a second clock. The two separate clocks may be at the same frequency, however, generally, the processor core operates at a higher frequency so the second clock is typically faster than the first. A source synchronous link 130 includes an embodiment of the invention to allow data timing synchronization between the two domains. Link 130 may utilize one of the embodiments described above, such as the circuit 10 of FIG. 1, to transition data from the I/O domain 110 into the core domain 120.

A variety of advantages are noted in utilizing such a source synchronous link. For example, no strobe based write state machines need be present at the data input to the processor domain 120. Thus, event sequencing of the data entry is maintained. Glitches or missed strobes may corrupt a data entry, but that error does not corrupt the subsequent data placement. The single error may be readily resolved by the normal processor data validity checking mechanism, such as parity checking. Thus, correctly ordered data, beyond the occurrence of the error in the strobe, may be maintained. Furthermore, the complexity of determining timing synchronization is moved to the receiving domain, instead of the sending domain, since the more reliable clock signal of the receiving domain may be used to determine the correct alignment of the data. Since the core clock of the processor is typically less prone to error conditions than the clock in the sending domain, the robustness of the source synchronization may be increased. That is, the likelihood of an error occurring has diminished over schemes using a write state machine at the input controlled by the strobe signal from the sending domain.

Thus, a scheme to increase the robustness of source synchronous links by avoiding write pointers based on strobes is described. It is to be noted that the example embodiments described a processor core as the second clock domain. However, other devices, including memory, chip sets and microcontrollers may readily provide the second clock domain. Futhermore, although a particular clocking and strobe signals are illustrated in the Figures, they need not be limited to such examples. For example, strobe signals may be pulse-shaped and sent when data is sent.

I claim:

1. An apparatus comprising:
a data receiving unit having a first latch and a second latch coupled to receive data from a first clock domain and to clock in the data with a first strobe signal and a second strobe signal, wherein the first strobe signal and the second strobe signal operate to clock in the data under timing of the first clock domain, wherein the first latch-latches the data using the first strobe signal, and the second latch latches the data using the second strobe signal; and
a data aligning unit coupled to receive data from the data receiving unit and to align data timing to synchronize with a clock signal operating under timing of a second clock domain to maintain correctly ordered data when a particular strobe signal is corrupted, said aligning unit coupled to receive the strobe signal and the clock signal to determine alignment timing difference between the strobe and clock signals and to align the data based on the alignment timing difference.

2. The apparatus of claim 1 wherein said data aligning unit includes an alignment delay unit to delay the data timing to synchronize the data timing to the clock signal, said data aligning unit to have its timing controlled by the clock signal instead of the strobe signal.

3. The apparatus of claim 2 wherein said data receiving unit separates data input into multiple paths to align the data based on a frequency of the strobe signal and recombining the data into a single path based on a frequency of the clock signal, the clock signal frequency being faster than the strobe signal frequency.

4. The apparatus of claim 3 wherein said data receiving unit has two paths, one path to be clocked by the first strobe signal and the second path to be clocked by the second strobe signal that is a complement of the first strobe signal.

5. The apparatus of claim 3 further including an output multiplexer coupled to said data aligning unit to multiplex data output from the multiple paths to a single output path with synchronized data.

6. The apparatus of claim 3 wherein said clock signal is less prone to corruption than the strobe signal.

7. The apparatus of claim 6 wherein the clock signal of the second clock domain is a core clock for a processor.

8. The apparatus of claim 7 wherein the first clock domain when operational includes an input/output device which is to be coupled to the processor of the second clock domain.

9. An apparatus comprising:
a first data latch and a second data latch coupled to receive data from a first clock domain and to clock in the data with a first strobe signal and a second strobe signal, wherein the first strobe signal and the second strobe signal operate to clock in the data under timing of the first clock domain, wherein the first data latch latches the data using the first strobe signal, and the second data latch latches the data using the-second strobe signal;
a data aligning circuit coupled to receive data from output of said latch and to align data timing to synchronize with a clock signal operating under timing of a second clock domain to maintain correctly ordered data when timing is corrupted by an erroneous strobe signal; and
an aligning control circuit coupled to receive the strobe signal and the clock signal to determine alignment timing difference between the strobe and clock signals and to generate a control signal to adjust the data timing to synchronize the data to the clock signal in the second clock domain.

10. The apparatus of claim 9 wherein said data aligning circuit further includes a delay circuit to delay the data timing to synchronize the data timing to the clock signal.

11. The apparatus of claim 9 wherein said first latch and said second latch provide separate paths to latch in multiple data input for a strobe cycle and the output from the latches coupled to separate delay units in said data aligning circuit to synchronize the data timing to the clock signal.

12. The apparatus of claim 11 further comprising a multiplexer coupled to said delay units to multiplex aligned data from the delay units into a sequential output.

13. The apparatus of claim 9 wherein said first latch and said second latch provide two paths to latch in sequential data, the first latch to be strobed by the first strobe signal and the second latch to be strobed by the second strobe signal that is a complement of the first strobe signal, so that two data inputs are strobed in one cycle of the first strobe signal.

14. The apparatus of claim 9 wherein said data aligning circuit further includes a corresponding delay circuit coupled to the first and second latches respectively to delay the data timing to synchronize the data timing to the clock signal.

15. The apparatus of claim 14 further comprising a multiplexer coupled to the delay units to multiplex aligned data from the delay units into a sequential data output.

16. The apparatus of claim 15 wherein said clock signal is less prone to corruption than the strobe signals.

17. The apparatus of claim 16, wherein said clock signal of the second domain is a core clock for a processor.

18. A computer comprising:
a processor to be clocked at a core clock rate from a core clock;
a component coupled to said processor to transfer data to said processor, said component operating in a first clock domain that is different clock domain from said core clock;
a first data latch and a second data latch coupled to receive data from the component, in which the data is clocked into the first data latch and the second data latch with a first strobe signal and a second strobe signal respectively, wherein the first strobe signal and a second strobe signal operate to clock in the data under timing of the first clock domain different from the core clock, wherein the first data latch latches the data using the first strobe signal, and the second data latch latches the data using the second strobe signal;
a data aligning circuit coupled to receive the data from output of said latch and to align data timing to synchronize with the core clock to maintain correctly ordered data when timing is corrupted by an erroneous strobe signal; and
an aligning control circuit coupled to receive the strobe signal and the core clock signal to determine alignment timing difference between the strobe and core clock signals and to generate a control signal to adjust the data timing to synchronize the data to the core clock.

19. The computer of claim 18 wherein said data aligning circuit further includes a delay circuit to delay the timing to synchronize the data timing to the core clock.

20. The computer of claim 18 wherein said first latch and said second latch are to provide two paths to latch in sequential data, the first latch to be strobed by the first strobe signal and the second latch to be strobed by the second strobe signal that is a complement of the first strobe signal, so that two data inputs are strobed in one cycle of the first strobe signal.

21. A method comprising:
receiving data from a first clock domain;
receiving a first strobe and a second strobe to latch in the data in which the first strobe and the second strobe operate under timing of the first clock domain;
latching in the data with the first strobe into the first latch and with the second strobe into the second latch, wherein the latching in the data into the first latch is performed using the first strobe and the latching in the data into the second latch is performed using the second strobe under timing of the first clock domain;
aligning the latched in data to synchronize the data to a timing of a clock signal that operates under control of a clock in a second clock domain; and
synchronizing the timing of the data from the first domain to the second domain to maintain correctly ordered data by avoiding use of write pointers to latch in the data.

22. The method of claim 21 wherein the latching in of the data includes latching in data into multiple data paths to align the data and combining the paths to have a common output path.

23. The method of claim 21 wherein the latching in of the data includes latching in data into two data paths in which the first strobe latches in data to one path and a complement of the first strobe latches in data to a second path, the data paths introducing a delay in the timing of the data to synchronize the timing of the data to the clock in the second clock domain.

24. The method of claim 21 wherein the synchronizing the timing of the data further includes maintaining correct ordering of subsequent data when erroneous data is latched in due to a glitch in the strobe.

25. The method of claim 21 wherein the synchronizing the timing of the data further includes maintaining correct ordering of subsequent data when previous data fails to be latched in due to a missing strobe.

* * * * *